United States Patent
Casado Montero et al.

(10) Patent No.: US 12,372,034 B2
(45) Date of Patent: Jul. 29, 2025

(54) CONDITIONING FUEL SYSTEM FOR AN AUXILIARY POWER UNIT OF AN AIRCRAFT

(71) Applicant: Airbus Operations S.L.U., Getafe (ES)

(72) Inventors: Carlos Casado Montero, Getafe (ES); Pablo Manuel Calderón Gómez, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 0 days.

(21) Appl. No.: 18/529,072

(22) Filed: Dec. 5, 2023

(65) Prior Publication Data
US 2024/0271576 A1 Aug. 15, 2024

(30) Foreign Application Priority Data
Feb. 15, 2023 (EP) ..................................... 23382141

(51) Int. Cl.
*F02C 7/224* (2006.01)
*B64D 41/00* (2006.01)
(Continued)

(52) U.S. Cl.
CPC ................ *F02C 9/28* (2013.01); *B64D 41/00* (2013.01); *F02C 7/224* (2013.01); *F23R 3/28* (2013.01);
(Continued)

(58) Field of Classification Search
CPC ............ F02D 19/0626; F02D 19/0628; F02D 41/3836; F02D 41/40; F02D 41/401;
(Continued)

(56) References Cited

U.S. PATENT DOCUMENTS 10,323,591 B2 * 6/2019 Rousseau ............... F02D 41/068
2008/0236939 A1 * 10/2008 Napier .................... F02K 1/827
60/770

(Continued)

FOREIGN PATENT DOCUMENTS

DE 102020215785 A1 6/2022
JP 2016145545 A 8/2016

OTHER PUBLICATIONS

European Search Report for corresponding European Patent Application No. 23382141.2 dated Aug. 4, 2023; priority document.

*Primary Examiner* — Thuyhang N Nguyen
(74) *Attorney, Agent, or Firm* — Greer, Burns & Crain, Ltd.

(57) ABSTRACT

An aircraft conditioning system including a fuel tank, including an outlet connected to an Auxiliary Power Unit (APU) fuel inlet, configured to maintain a pressurized gas fuel, a pressure regulator, downstream of the fuel tank, configured to regulate a pressure of the pressurized gas fuel injected to the APU inlet, a first temperature sensor downstream of the pressure regulator and a second temperature sensor upstream of an engine, a first pressure sensor inside the fuel tank, a second pressure sensor downstream of the pressure regulator and a third pressure sensor at an engine inlet, and a controller connected to the pressure sensors and the temperature sensors, the controller receiving temperature and pressure values from the pressure sensors and from the temperature sensors and actuating on at least one of the pressure regulator or the injection position of the pressurized gas fuel inside a plurality of engine combustion chambers.

15 Claims, 3 Drawing Sheets

(51) Int. Cl.
*F02C 9/28* (2006.01)
*F23R 3/28* (2006.01)

(52) U.S. Cl.
CPC .. *F05D 2270/301* (2013.01); *F05D 2270/303* (2013.01)

(58) Field of Classification Search
CPC .. F02D 41/402; F02C 7/32; F02C 7/22; F02C 7/222; F02C 7/224; F02C 7/236; F02C 9/26; F02C 9/263
See application file for complete search history.

(56) References Cited

U.S. PATENT DOCUMENTS

| | | | |
|---|---|---|---|
| 2010/0100300 A1 | 4/2010 | Brooks et al. | |
| 2011/0130941 A1* | 6/2011 | Szepek | F02C 9/32 701/100 |
| 2014/0294559 A1* | 10/2014 | Holcomb | F02C 9/263 415/1 |
| 2015/0128902 A1* | 5/2015 | Joshi | F02D 19/0642 123/304 |
| 2015/0275781 A1 | 10/2015 | Matar et al. | |
| 2016/0091381 A1* | 3/2016 | Mehrer | F02C 7/236 73/112.01 |
| 2016/0141672 A1* | 5/2016 | Toida | H01M 8/04097 429/444 |
| 2021/0047971 A1 | 2/2021 | Turner et al. | |
| 2021/0239054 A1* | 8/2021 | Reuter | F02C 7/232 |
| 2023/0092811 A1* | 3/2023 | Palmer | F02C 3/22 60/39.281 |

* cited by examiner

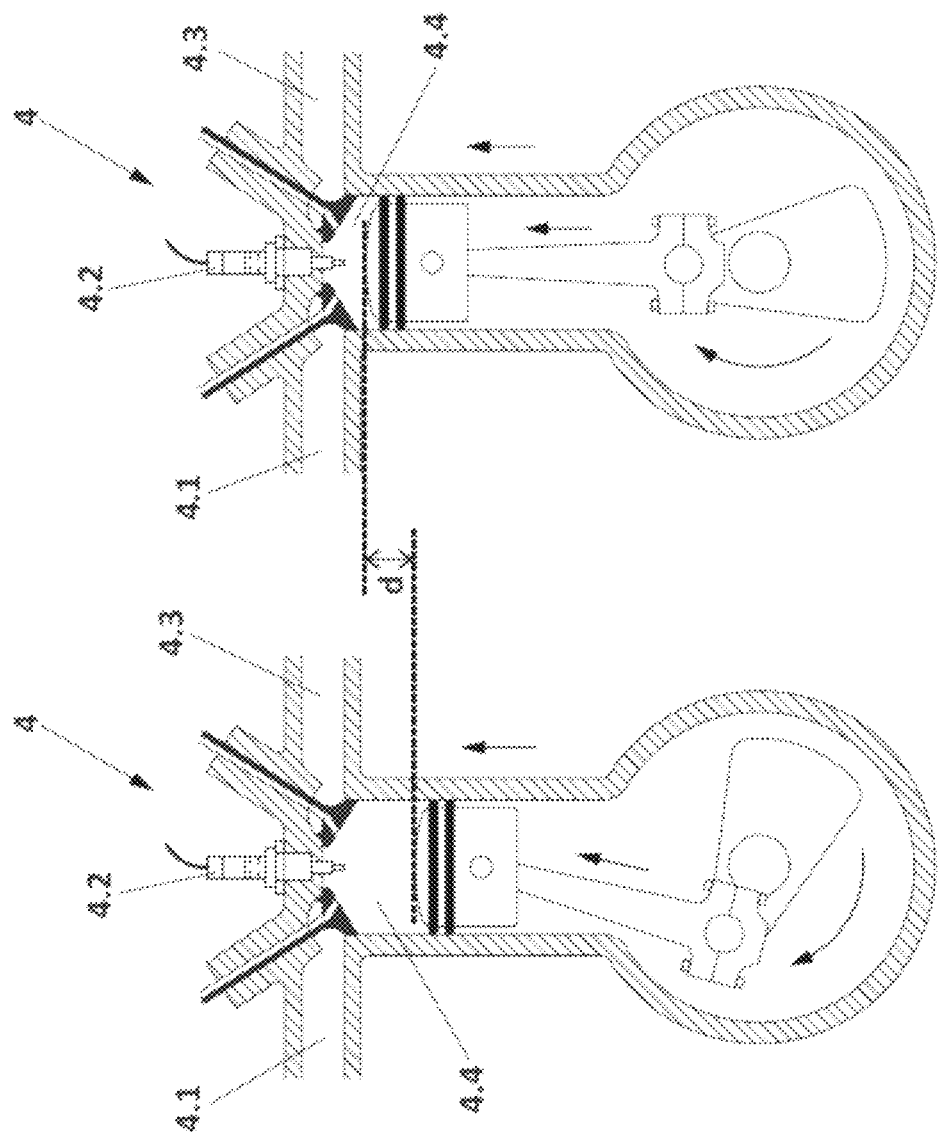

CONDITIONING FUEL SYSTEM FOR AN AUXILIARY POWER UNIT OF AN AIRCRAFT

CROSS-REFERENCES TO RELATED APPLICATIONS

This application claims the benefit of the European patent application No. 23382141.2 filed on Feb. 15, 2023, the entire disclosures of which are incorporated herein by way of reference.

FIELD OF THE INVENTION

The present invention relates to a conditioning system for an aircraft. More particularly, the present invention relates to an auxiliary power system with a new fuel feed architecture including a fuel tank. In addition, the present invention also refers to an aircraft comprising the conditioning system and a method for conditioning fuel of an auxiliary power system.

BACKGROUND OF THE INVENTION

In the aeronautical field, some of the main identified challenges aim to reduce fuel emissions. In that sense, implementing the use of new gases in an aircraft based on renewable energy, for example hydrogen, are alternatives for intending to provide sufficient energy to the aircraft while replacing the fossil fuel actually used. Due to its high energy density, hydrogen is an interesting solution for aircraft.

Known technologies exist in the automotive field like cars having dedicated hydrogen tanks installed and connected to the engines in order to feed them with non-fossil fuel. Liquid and gas hydrogen tanks are key components for future generations of engines reducing emissions and being more sustainable at the same time for the environment.

In the aeronautical field, implementing dedicated hydrogen tanks in an aircraft to supply large quantities of fuel to an engine is considered as a challenge. One of the most challenging issues are related to sizing tanks for an aircraft, maintaining hydrogen in its optimal parameters while in flight and being able to safely and efficiently feed an aircraft engine with hydrogen.

However, some other issues of using hydrogen as a fuel in an aircraft are directed towards providing sufficient quantity of fuel to an engine and also complying with storage parameters which are necessary in an aircraft. At the same time, and as it is well known in the aeronautical field, the importance of designing fuel tanks which provide additional weight to an aircraft has to be taken into account in order to meet on-ground and in-flight requirements. Also, due to hydrogen storage parameters and known flight conditions, there exists a specific issue for adapting dedicated hydrogen tanks so that the engines of the aircraft keep meeting with its flying requirements. Some of the aircraft engines, such as auxiliary power units, must perform at a high standard in order to provide power when in-flight so that the auxiliary power unit is able to start quickly and supply electrical power to the essential equipment of the aircraft and that all requirements are met for a safe flight.

Therefore, and taking into account the above-mentioned conditions, known solutions currently in use and implemented in technical fields other than the aeronautical field are not depending on these highly demanding conditions in which aircraft operate when on ground or, more particularly, when in-flight. That is, there is a need in the art for a conditioning system able to monitor the parameters of hydrogen provided as fuel for an engine and maximizing the storing of hydrogen gas of an aircraft while meeting with aircraft in flight conditions.

SUMMARY OF THE INVENTION

In a first inventive aspect, the invention provides a conditioning system for an aircraft comprising an Auxiliary Power Unit (APU), wherein the Auxiliary Power Unit comprises:
   a fuel inlet configured to supply a pressurized gas fuel to a fuel conduit,
   an engine comprising an inlet connected to the fuel conduit, an outlet connected to an APU outlet, the APU outlet being configured to exhaust gases out of the engine, a plurality of injectors and a plurality of combustion chambers,
the fuel conduit is connecting the fuel inlet to the engine, wherein the conditioning system comprises,
   a fuel tank comprising an outlet connected to the fuel inlet of the Auxiliary Power Unit, the fuel tank being configured to maintain the pressurized gas fuel pressurized at pressure Pf,
   pressure regulating means located downstream of the fuel tank, the pressure regulating means being configured to regulate the pressure of the pressurized gas fuel injected to the fuel inlet of the Auxiliary Power Unit,
   a first temperature sensor located downstream of the pressure regulating means and a second temperature sensor located upstream of the engine,
   a first pressure sensor located inside the fuel tank, a second pressure sensor located downstream of the pressure regulating means and a third pressure sensor located at the inlet of the engine, and
controlling means connected to the first, second and third pressure sensors, and to the first and second temperature sensors, the controlling means being configured
for receiving temperature and pressure values from the first, second and third pressure sensors and from the first and second temperature sensors and
for actuating on the pressure regulating means and/or the injection position of the pressurized gas fuel inside the plurality of combustion chambers of the engine, and
the conditioning system being configured for
actuating the pressure regulating means and injecting the pressurized gas fuel at a fix position into the plurality of combustion chambers of the engine by means of the controlling means when a pressure P3 of the third pressure sensor is higher or equal to a pressure pre-established reference value Pref, or
actuating the pressure regulating means and injecting the pressurized gas fuel at a lower position into the plurality of combustion chambers of the engine by means of the controlling means when the pressure P3 of the third pressure sensor is lower than Pref.

The present conditioning system comprises an APU providing standard functions such as delivering electrical and/or pneumatic power for on ground and in-flight operations.

The APU of the invention comprises a fuel inlet configured to supply a pressurized gas fuel to a fuel conduit. The fuel conduit connects the fuel inlet to an engine, more particularly to the plurality of combustion chambers of the engine and the engine also comprises a plurality of injectors.

Then, the engine of the APU comprises an inlet connected to the fuel conduit and an outlet connected to the APU outlet.

The APU outlet is configured to exhaust gas out of the engine. In a particular embodiment, the exhaust gases are $NO_x$.

The conditioning system of the invention comprises a fuel tank having an outlet connected to the fuel inlet of the APU and which is configured to maintain the pressurized gas fuel at a pressure Pf. The sizing of the fuel tank is crucial for the invention to be implemented in an aircraft since an excessive oversizing of the fuel tank can lead to high increase of the total weight of the aircraft and a large volume required to install the fuel tank.

However, the fuel tank is advantageously oversized in order to ensure a constant provision of fuel from the fuel tank to the APU at a constant pressure required for the engine of the APU to be efficient. The pressure of the fuel injected to the fuel conduit, and by extension to the engine, is comprised between 8000 and 20000 kPa, more preferably superior or equal to 15000 kPa. Maintaining such a value of fuel pressure ensures the efficiency of the engine of the APU for on ground or in-flight requirements.

The conditioning system comprises pressure regulating means located downstream of the fuel tank in order to regulate the pressure of the pressurized gas fuel injected to the fuel inlet of the APU.

Advantageously, the pressure regulating means ensures constant injection of pressurized gas fuel at the required pressure, comprised between 8000 and 20000 kPa, more preferably superior or equal to 10000 kPa, in order to provide the necessary pressurized gas fuel quantity for the engine of the APU to be fully efficient.

Also advantageously, the pressure regulating means provides to the conditioning system of the invention the ability to adapt the pressure of the pressurized gas fuel delivered from the fuel tank to the fuel conduit, thus to the engine, in order to provide sufficient fuel to the engine so that it generates power while the quantity of fuel of the fuel tank is lower, particularly when the pressurized gas fuel is emptying and, thus, the pressure value Pf inside the fuel tank decreases and gets closer to 15000 kPa or closer to 10000 kPa. Therefore, the pressure regulating means helps to compensate the lower pressure value with respect to the reference value by adjusting the injection position of the fuel inside the engine.

The conditioning system also comprises a first temperature sensor located downstream of the pressure regulating means and a second temperature sensor located upstream of the engine.

The first temperature sensor provides monitoring parameters regarding the temperature of the pressurized gas fuel at an early point of the conditioning system, before being injected at the inlet of the APU. The second temperature sensor provides monitoring parameters regarding the temperature of the fuel before entering the engine in order to ensure that the pressurized gas fuel is at the required temperature so that the fuel conduit and the engine are not damaged by a pressurized fuel that would be colder than required and that do not contribute to a controlled combustion that may generate inefficiencies, uncontrolled behavior or shutdowns. Preferably, the pressurized gas fuel temperature is above or equal to 15° C.

The conditioning system of the present invention comprises a first, a second and a third pressure sensor. The first pressure sensor is located inside the fuel tank and provides constant monitoring of the pressure Pf. The second pressure sensor is located downstream of the pressure regulating means and ensures the correct pressure value of the pressurized gas fuel to be injected into the APU inlet so that the pressure regulating means can be adjusted if the pressure value at the second pressure sensor is higher or lower than a pressure pre-established reference value Pref. The third pressure sensor is located at the inlet of the engine in order to monitor the pressure value of the pressurized gas fuel at that specific point of the conditioning system, that is, before injection into the plurality of combustion chambers of the engine.

In some embodiments, a master-slave algorithm is implemented between the above mentioned sensors in order to rank the monitored values measured inside the conditioning system by importance. In some preferred embodiments, the third pressure sensor and the second temperature sensor should be considered master and the first and second pressure sensors and the first temperature sensor should be considered as slaves.

The conditioning system also comprises controlling means which are connected to the first, second and third pressure sensors and to the first and second temperature sensors. The controlling means are also configured for controlling and receiving temperature and pressure values from the above-mentioned sensors in order to compare respective temperature and pressure values at different points of the conditioning system. This specific architecture of sensors and controlling means provides a precise and constant monitoring of the fuel parameters from the fuel tank until its combustion inside the plurality of combustion chambers of the engine.

The conditioning system of the invention, by means of the controlling means, is also configured for actuating on the pressure regulating means and/or the injection position of the pressurized gas fuel inside the plurality of combustion chambers of the engine so that, when the pressure inside the fuel conduit is lower than the pressure value Pref, the controlling means actuate on the pressure regulating means in order to inject the pressurized gas fuel from the fuel tank into the APU at a lower pressure. When the pressure inside the fuel conduit is lower than the required pressure value, the controlling means actuate on the pressure regulating means in order to adjust the point of injection inside the engine, by lowering the point of injection inside the plurality of combustion chambers in the engine, in order to ensure adequate injection of the fuel. At the same time, when low pressure is detected in the fuel tank, the controlling means actuates on the injection position inside the plurality of combustion chambers of the engine in order to inject the pressurized gas fuel at a lower position which would provide to the engine its ability to still generate power. Therefore, the injection position of pressurized gas fuel inside the engine is not performed at the optimal point of injection inside the plurality of combustion chambers but at a lower position which decreases the required pressurized gas fuel intake of the engine and allows the conditioning system of the invention to use the remaining pressurized gas fuel from the fuel tank while still generating power through the engine of the APU.

A "lower position of injection" is to be understood as an injection position which requires that the pressurized gas fuel is injected at a lower position where the pressure is lower with respect to a "fix position" and its corresponding pressure value. The "fix position" of injection inside the plurality of combustion chambers of an engine is considered the optimal injection position so that the engine is functioning in its optimal conditions.

The conditioning system of the invention also helps during emergency situations so that the APU can be used as the last power generator of the aircraft. Also, the conditioning system of the invention is able to prolong the APU's ability to operate and generate power by using the pressurized gas fuel residue from the fuel tank, injecting the fuel into the plurality of combustion chambers of the engine at a lower injection position inside the plurality of combustion chambers of the engine. In that case, the pressurized gas fuel available inside the fuel tank is lower than pressure Pref, preferably when the pressure P3 of the third pressure sensor is lower than Pref. Preferably, Pref is comprised between 8000 and 20000 kPa, more preferably Pref is set at 15000 kPa.

Even though the efficiency of the engine is reduced by injecting the fuel at lower pressure value and at a lower position of the plurality of combustion chambers, the injection of the residual pressurized gas fuel from the fuel tank is able to generate enough power from the APU so that sufficient power is provided to the aircraft for maintaining in-flight conditions for a period of a few minutes. In order to do so, the controlling means allows the pressurized gas fuel from the fuel tank to be injected into the plurality of combustion chambers of the engine at a lower position than the optimal point of injection, also called fix position. By accepting the reduction of efficiency of the engine and reduction of power demand, the residual pressurized gas fuel from the fuel tank can be consumed instead of remaining unused inside the fuel tank.

In a particular embodiment, the controlling means further comprises:
  fuel controlling means and engine controlling means, wherein
    the first temperature sensor and the first and second pressure sensors are connected to the fuel controlling means,
    the second temperature sensor and the third pressure sensor are connected to the engine controlling means,
    the fuel controlling means are configured for controlling the pressure regulating means and are connected to the engine controlling means, and
    the engine controlling means are configured for controlling the position of injection of the pressurized gas fuel inside the plurality of combustion chambers of the engine and are configured for receiving the temperature and pressure values from the second temperature sensor and/or from the third pressure sensor and/or from the fuel controlling means.

In this particular embodiment, the conditioning system comprises two dedicated controlling means. The fuel controlling means are configured for controlling the pressure regulating means and the engine controlling means are configured for controlling the position of injection of the pressurized gas fuel inside the plurality of combustion chambers of the engine. Then, the engine controlling means are also configured for receiving the temperature and pressure values from the second temperature sensor and/or from the third pressure sensor and/or from the fuel controlling means. Due to the reception of the above mentioned pressure and temperature values, the engine controlling means is able to control the injection position of the pressurized gas fuel inside the plurality of combustion chambers of the engine so that, when the fuel tank is at a low pressure, the injection position inside the plurality of combustion chambers of the engine is modified, reducing the required pressure of injection, prolonging the functioning of the APU at a lower efficiency.

The fuel controlling means are connected to the engine controlling means in order to process, compare and share data monitored along the conditioning system of the invention.

Advantageously, the connection between the fuel controlling means and the engine controlling means is continuous and instantaneous. Also, by implementing two specific controlling means, the fuel controlling means and the engine controlling means, the risk of losing control if one of the two controlling means fails is lower, minimizing at the same time the risk of the controlling means to malfunction while providing higher operability and flexibility ratios.

In a particular embodiment, the conditioning system further comprises a valve located upstream of the inlet of the APU.

The valve located upstream of the inlet of the APU provides security to the conditioning system in emergency situations so that the injection of pressurized gas fuel from the fuel tank through the inlet of the APU may be closed at any time.

In a particular embodiment, the plurality of injectors of the engine comprises direct injection ports.

Advantageously, direct injection provides the ability to the engine to generate more power due to the acceptance of higher pressure by the engine resulting in enhanced efficiency of the engine and, thus, consumption. Also, preignition and backfire risks are reduced.

Additionally, common combustion chambers comprise additional valves which have to be closed when the fuel is injected inside the combustion chambers by direct injection in order to further reduce backfire risks, more particularly in case of using gaseous hydrogen.

In a particular embodiment, the conditioning system further comprises silencing means located at the APU outlet.

In a particular embodiment, the Auxiliary Power Unit further comprises heating means connected to the fuel inlet and located upstream of the engine, the heating means being configured to supply heat to the pressurized gas fuel of the fuel conduit and wherein the conditioning system is configured for actuating the heating means by means of the controlling means when a temperature T2 at the second temperature sensor is lower than a temperature pre-established reference value Tref, preferably Tref is comprised between −10° C. and 15° C.

The heating means are configured to supply heat to the pressurized gas fuel of the fuel conduit so that the pressurized gas fuel reaches the required temperature and that neither the fuel conduit, the engine, or even the complete conditioning system, end up damaged by injecting the fuel at a colder temperature than it is required but also avoiding producing inefficiencies, lack of control of the combustion process or shutdowns.

The conditioning system of the invention is able to actuate the heating means when the pressurized gas fuel of the fuel conduit is at a temperature less than the required temperature so that the fuel conduit and the engine are not damaged or endure undesirable effects in the control or the performance of the engine.

In some embodiments, the heating means are provided with a dedicated independent battery which ensures the availability of actuating the heating means at all times without depending on the power generated from the APU.

In some embodiments, the heating means are actuated in order to warm up the fuel when its temperature is lower than the temperature pre-established reference value, preferably 15° C.

In some embodiments, the heating means are located as close as possible to the engine in the conditioning system of the invention in order to avoid losing heat while the fuel is going through the fuel conduit and enhancing chances to start the engine after a long cold soak. Therefore, heating effects and benefits of fuel heating are apparent sooner.

In a particular embodiment, the fuel pressure in the fuel tank, before actuating the APU, is between 35000 kPa and 100000 kPa. Thus, when the fuel tank is filled at the selected fuel pressure between 35000 kPA and 100000 kPA, the selected fuel pressure is considered as the maximum operative fuel pressure supported by the fuel tank.

The pressurized gas fuel of the fuel tank is pressurized between 35000 kPa and 100000 kPa in order to ensure constant injection of gas fuel and stocking the highest fuel quantity inside the fuel tank, preferably at least 15000 kPa of fuel into the plurality of combustion chambers of the engine. The specific value of 15000 kPa being the maximum pressure required for injectors so that the engine functions at its optimal conditions.

In a particular embodiment, the portion of the fuel conduit between the heating means and the inlet of the engine is a flexible hose.

In a particular embodiment, the pressurized gas fuel is hydrogen ($H_2$).

In a particular embodiment, the engine is an intermittent combustion engine such as Wankel engines, linear piston engines, boxer piston engines or opposed piston engines.

In a second inventive aspect, the present invention provides an aircraft comprising a conditioning system according to any of the embodiments of the first inventive aspect.

The aircraft is provided with a conditioning system which allows a modification of the pressurized gas fuel injection position inside the plurality of combustion chambers of the engine so that the residual pressurized gas fuel from the fuel tank, when Pf is, preferably, lower than 15000 kPa, can be used and generate additional power that may be provided to the aircraft in emergency situations.

In a third inventive aspect, the present invention provides a method for conditioning fuel of an Auxiliary Power Unit of an aircraft according to the second inventive aspect of the invention, the method comprising the following steps:
  monitoring temperatures T1 and T2 at the first and second temperature sensors respectively,
  monitoring pressures P1, P2 and P3 at the first, the second and the third pressure sensors respectively,
  comparing the temperatures T1 and T2 and pressures P1, P2 and P3 respectively with temperature and pressure pre-established reference values Tref and Pref by means of controlling means, and
  controlling the pressure regulating means and/or the injection position inside the plurality of combustion chambers of the engine by means of the controlling means.

The present method allows monitoring temperatures and pressures at different locations of a conditioning system for an aircraft, comparing the temperature and pressure between them respectively and controlling the pressure regulating means and/or the injection position inside the plurality of combustion chambers of the engine. The method controls the injection of pressurized gas fuel in the engine based on the monitoring of the temperature and pressure values of the pressurized gas fuel along the conditioning system of any embodiment of the first inventive aspect of the invention.

According to the present method, monitoring temperatures and pressures at specific points of the conditioning system provide information to the controlling means so that they are able to process and compare the above-mentioned data with temperature and pressure pre-established reference values respectively. Consequently, based on the in-flight conditions, the pressure regulating means and/or the injection position of the pressurized gas fuel inside the plurality of combustion chambers of the engine are actuated or modified in order to increase or decrease the fuel mass flow injected into the APU, and thus into the engine at a lower pressure value when needed.

In some embodiments, the pre-established reference values Tref and Pref are preferred values when the conditioning system is functioning, either in optimal conditions or in conditions where the conditioning system starts controlling the pressure regulating means and/or the injection position inside the plurality of combustion chambers of the engine by means of the controlling means due to the variation of temperature values T1 and T2 and/or the variation of pressure values P1, P2 and P3 with respect to the pre-established temperature and pressure reference values.

In an embodiment, the pre-established temperature reference value is 15° C.

In an embodiment, the pre-established pressure reference value is 15000 kPa.

In a particular embodiment, the pre-established temperature reference value is 15° C. and the pre-established pressure reference value is 15000 kPa.

In a particular embodiment, if P3≥ Pref, the method further comprises the following steps:
  actuating the pressure regulating means by means of the controlling means,
  injecting the pressurized gas fuel at a fix position into the plurality of combustion chambers of the engine by means of the controlling means.

If the pressure of the pressurized gas fuel at the inlet of the engine is higher than the pre-established pressure reference value, preferably comprised between 8000 and 20000 kPa and more preferably equal to 15000 kPa, then the pressure regulating means is actuated by means of the controlling means and the injection position inside the plurality of combustion chambers of the engine is also actuated by means of the controlling means. That is, the pressurized gas fuel is injected at a constant pressure value and, ideally, close to the maximum pressure value supported by the engine, preferably comprised between 8000 and 20000 kPa and more preferably equal to 15000 kPa.

By actuating the injection position, the controlling means allow the injection of the pressurized gas fuel from the fuel conduit at a fix position of the plurality of injectors which is to be understood as the injection point where the engine is able to generate the most power allowable from the engine, i.e., the optimal point of injection. The "fix position" should also be understood as, for example, the highest point reached by a piston, or close to the highest point, of a common combustion chamber of an alternative combustion engine.

In that particular fix position, the pressurized gas fuel has to be injected inside the plurality of combustion chambers of the engine at a pressure above or equal to the pre-established pressure reference value, preferably 15000 kPa, in order for the engine to function at its highest capacity/efficiency for generating power.

Also, in case the pressure value of the pressurized gas fuel injected inside the plurality of combustion chambers, monitored by means of the first pressure sensor, drops under the pre-established pressure reference value, the controlling means actuates on the point of injection in order to permit consumption of the pressurized residual gas fuel from the fuel tank. Otherwise, according to the systems used in the industry, the adverse pressure gradient that such residual gas fuel would face at the entrance of the plurality of combustion chambers at a fix position would prevent its injection and consequent use to extract power and continue operating the engine.

In a particular embodiment, if P3<Pref, the method further comprises the following steps:
actuating the pressure regulating means by means of the controlling means,
injecting the pressurized gas fuel at a lower position of the plurality of injectors into the plurality of combustion chambers of the engine by means of the controlling means.

If the pressure of the pressurized gas fuel at the inlet of the engine is lower than pressure Pref, preferably between 8000 and 20000 kPa, more preferably 15000 kPa, the controlling means actuates on the pressure regulating means in order to adapt the fuel mass flow injected in the APU so that the residual pressurized gas fuel of the fuel tank can be used in case of emergency. At the same time, the controlling means actuates on the position of injection of the pressurized gas fuel inside the plurality of combustion chambers of the engine by means of the controlling means. The "lower position" of injection is to be understood as a lower position with respect to the fix position of injection, the optimal injection position, inside the plurality of combustion chambers but also where the pressure is lower that the pressure of the fix position of injection. That is, by injecting the pressurized gas fuel at a lower position than the fix position, more fuel mass flow is required for the engine to produce the same power obtained when injected at the fix position, reducing the generated power produced by the engine but also saving fuel and optimizing the usage of the residual fuel from the fuel tank so that the APU provides additional power if the aircraft suffers an emergency situation. Therefore, for obtaining the same values of produced power, more fuel needs to be injected when injected at a lower position with respect to the quantity of fuel injected at the fix position.

In some further embodiments, the "lower position" of injection may be interpreted as lower with respect to the previous injection position, which may already have been "lowered" with respect to the predefined "fix position" of the combustion chamber.

In that sense, the injection position can be precisely determined, progressively and dynamically controlled in order to inject the pressurized gas fuel in such "lower position" with respect to the previous injection position, that is, either the fix position or the previous lower position of injection.

Additionally, controlling both the pressure regulating means and the plurality of injectors allow continuous control and monitoring of pressure and injection parameters of the fuel from the fuel tank.

In some embodiments, the pressure regulating means are actuated by the controlling means in order to provide pressurized gas fuel in a consistent manner till reaching a low pressure value, preferably between 3000 kPa and 5000 kPa, so that the engine functions at low efficiency but still provides enough power to the aircraft until the residual pressurized gas fuel from the fuel tank is almost fully consumed.

In some embodiments, the lower position of injection is a pre-established position which ensures to the aircraft a pre-determined time of additional generated power by the APU corresponding to the consumption of the residual fuel from the fuel tank.

In some other embodiments, when there exists a plurality of positions of injection, each time lower than the previous injection position, these positions are pre-established positions having corresponding pre-established pressure values.

In a particular embodiment, if T2<Tref, the method further comprises the following steps:
actuating the heating means by means of the controlling means.

In order to provide fuel at a temperature which avoids damaging the fuel conduit and/or the engine of the APU or enduring undesirable effects in the control or the performance of the engine, the heating means are actuated if the temperature monitored at the second temperature sensor is inferior to Tref. Preferably Tref is comprised between −10° C. and 15° C., more preferably Tref is equal to 15° C.

In some embodiments, in step i), the heating means are actuated by means of the engine controlling means.

In a particular embodiment, the fuel is injected into the plurality of combustion chambers by direct injection.

In a particular embodiment, in step d) of any of the embodiments of the third inventive aspect, the pressure regulating means are controlled by means of the fuel controlling means and the injection position inside the plurality of combustion chambers of the engine is controlled by means of the engine controlling means.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIGS. 3a-3b show positions of injection of the engine according to an embodiment of the invention.

DETAILED DESCRIPTION OF THE PREFERRED EMBODIMENTS

Figure 1:
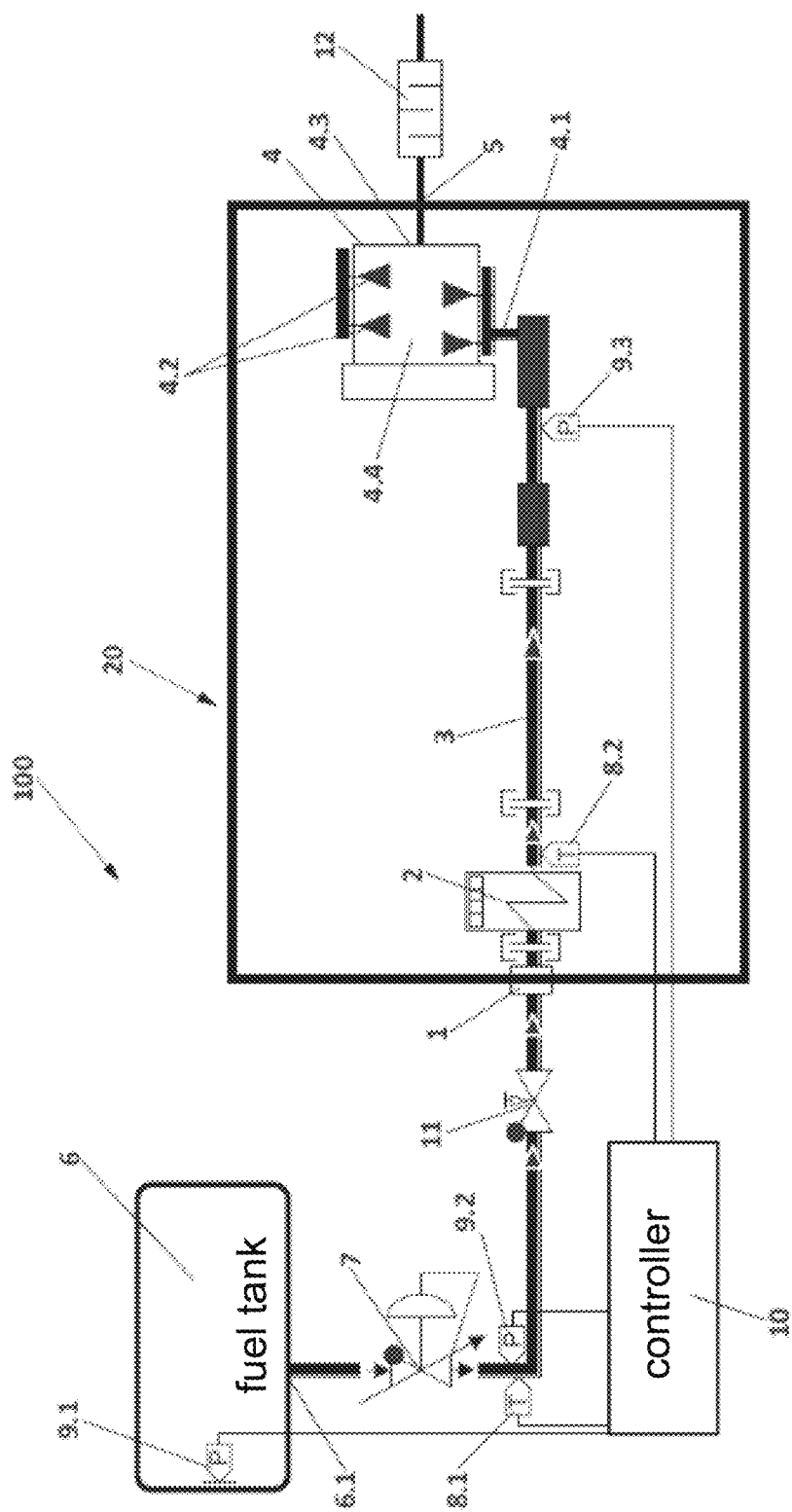
FIG. 1 shows the conditioning system according to an embodiment of the invention.

FIG. 1 shows a schematic representation of a conditioning system (100) for an aircraft according to an embodiment of the invention.

In the present embodiment, the conditioning system comprises an Auxiliary Power Unit (APU) (20) which comprises a fuel inlet (1), heating means in the form of a heater (2), a fuel conduit (3), an engine (4) and an APU outlet (5). Pressurized gas fuel is supplied to the fuel conduit (3) of the APU (20) by means of the fuel inlet (1).

In some embodiments, the pressurized gas fuel of the fuel conduit (3) is gaseous hydrogen ($H_2$).

The engine (4) of FIG. 1 comprises an inlet (4.1), a plurality of injectors (4.2), a plurality of combustion chambers (4.4) and an outlet (4.3). The fuel conduit (3) connects the fuel inlet (1) to the engine (4) by means of the inlet (4.1) of the engine (4). The outlet (4.3) of the engine (4) is connected to the APU outlet (5) and is configured to exhaust gases out of the engine (4), thus out of the APU (20). In some embodiments, exhausted gases from the engine (4) are $CO_2$ and $NO_x$.

In the embodiment of FIG. 1, a silencer (12), also called muffler, is connected to the APU outlet (5).

In some embodiments, the portion of the fuel conduit (3) between the heating means (2) and the inlet (4.1) of the engine (4) is a flexible hose.

In the embodiment of FIG. 1, the conditioning system (100) also comprises a fuel tank (6) connected to the fuel inlet (1) of the APU (20). The fuel tank (6) comprises an outlet (6.1) and pressure regulating means in the form of a pressure regulator (7) are located at the outlet (6.1) of the fuel tank (6). The fuel tank (6) is configured to maintain the pressurized gas fuel at pressure Pf and further inject fuel at the inlet (1) of the APU (20).

In some embodiments, the pressurized gas fuel in the fuel tank (6) is pressurized between 35000 kPa and 100000 kPa.

Also in the present embodiment, a valve (11) is located upstream of the inlet (1) of the APU (20) in order to stop injection of fuel in the APU (20) at any time.

According to the invention and the embodiment of FIG. 1, the pressurized gas fuel from the fuel tank (6) is injected in the fuel conduit (3) of the APU (20) through the inlet (1) in order to supply pressurized gas fuel into the engine (4). In preferred embodiments, the fuel supplied to the engine (4) is injected at a pressure above or equal to 15000 kPa so that the engine (4) efficiency is optimal.

The conditioning system (100) of the present embodiment also comprises two temperature sensors (8.1, 8.2) and three pressure sensors (9.1, 9.2, 9.3). The first temperature sensor (8.1) is located downstream of the pressure regulating means (7) and monitors the temperature of the fuel at the outlet (6.1) of the fuel tank (6). The second temperature sensor (8.2) is located upstream of the engine (4) and monitors the temperature of the fuel before entering the fuel conduit (3) and the engine (4). The temperature of the pressurized gas fuel monitored at the second temperature sensor (8.2) has to be warm enough so that the fuel conduit (3) and the engine (4) are not damaged. In preferred embodiments, the temperature of the fuel monitored at the second temperature sensor (8.2) is higher than 15° C.

In case the temperature of the pressurized gas fuel monitored at the second temperature sensor (8.2) is lower than the required temperature, preferably 15° C., the heating means are actuated.

Then, the conditioning system (100) of the invention and of the embodiment of FIG. 1 comprises three pressure sensors (9.1, 9.2, 9.3). The first pressure sensor (9.1) is located inside the fuel tank (6) so that the pressure value of the pressurized gas fuel inside the fuel tank (6) is constantly monitored. The second pressure sensor (9.2) is located downstream of the pressure regulating means (7) so that the pressure of the pressurized gas fuel is monitored before being injected inside the APU (20). The third pressure sensor (9.3) is located upstream of the inlet (4.1) of the engine (4) in order to monitor the pressure of the fuel before being injected inside the engine (4). The second (9.2) and the third (9.3) pressure sensors also help ensuring that the conditioning system (100) is not suffering leakage or pressure loss.

In the embodiment of FIG. 1, two temperature sensors (8.1, 8.2) and three pressure sensors (9.1, 9.2, 9.3) are connected to controlling means or controller (10) configured for receiving temperature and pressure values from the first (9.1), second (9.2) and third (9.3) pressure sensors and from the first (8.1) and second (8.2) temperature sensors and the controlling means (10) are configured for actuating on the pressure regulating means (7) and/or the injection position of the pressurized gas fuel inside the plurality of combustion chambers (4.4) of the engine (4).

Figure 2:
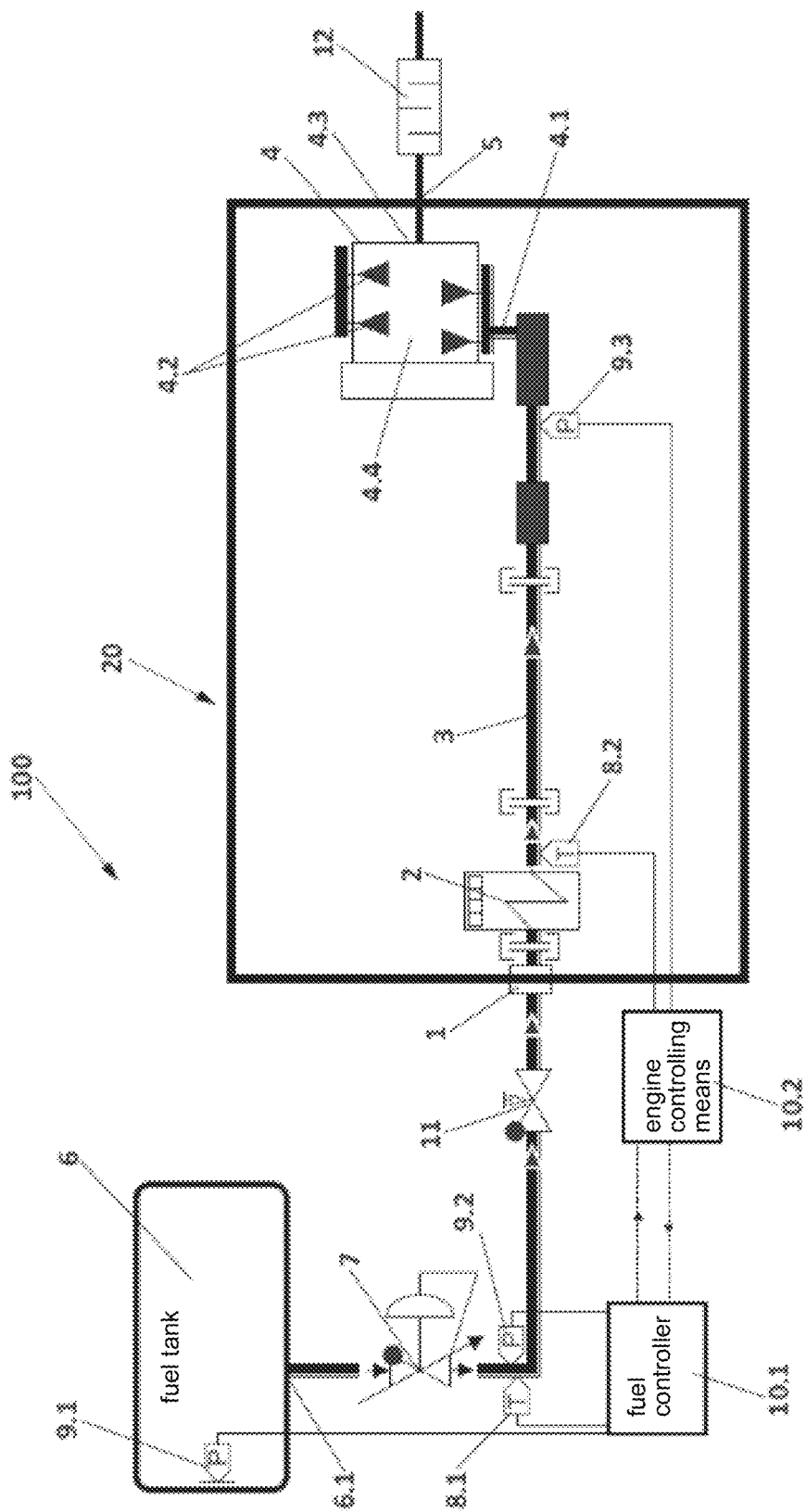
FIG. 2 shows the conditioning system according to an embodiment of the invention.

FIG. 2 shows another embodiment of the invention where the first temperature sensor (8.1) and the first (9.1) and second (9.2) pressure sensors are connected to fuel controlling means or fuel controller (10.1) and the second temperature sensor (8.2) and the third pressure sensor (9.3) are connected to engine controlling means or engine controller (10.2). Also, the fuel controlling means (10.1) are connected to the engine controlling means (10.2).

In the same FIG. 2, the fuel controlling means (10.1) together with the engine controlling means (10.2) are configured for processing, storing and comparing the temperature and pressure values of the plurality of sensors with the pre-established reference values (8.1, 8.2, 9.1, 9.2, 9.3). Once these temperature and pressure values are compared, the fuel controlling means (10.1) consequently actuates the pressure regulating means (7) and/or the engine controlling means (10.2) consequently actuates the plurality of injectors (4.2) of the engine (4).

Method for Controlling the Fuel

According to the method of the invention, if the pressure P3, being the pressure monitored at the third pressure sensor (9.3), is higher or equal to 15000 kPa, the controlling means (10), or in other embodiments the fuel controlling means (10.1), actuates the pressure regulating means (7) in order to maintain the pressure of the injected fuel constant so that the engine (4) efficiency, thus the generated power by the APU (20), is optimal. In that case, when the pressurized gas fuel injected in the plurality of combustion chambers (4.4) of the engine (4) is at 15000 kPa, the pressurized gas fuel is injected at a fix position of the plurality of injectors (4.2) into the plurality of combustion chambers (4.4) of the engine (4) which correspond to the optimal pressure value, around 15000 kPa, inside the combustion chambers (4.4). The fix position is the injection point where the plurality of combustion chambers (4.4), thus the engine (4), is able to generate the most power allowable from the engine (4), i.e., the optimal point of injection.

In that particular fix position, the fuel has to be injected inside the plurality of combustion chambers (4.4) of the engine (4) at the pressure value previously cited which is around 15000 kPa in order for the engine (4) to function at its highest capacity/efficiency for generating power. Therefore, the injection of the fuel at this particular pressure value, 15000 kPa, combined with the optimal injection point in the engine (4), through the plurality of injectors (4.1), allow the APU (20) to generate power at optimal conditions for an aircraft.

Also according to the method of the invention, if the pressure P3, being the pressure monitored at the third pressure sensor (9.3), is lower than 15000 kPa, the fuel controlling means (10.1) actuates the pressure regulating means (7) in order to reduce the pressure of the injected fuel so that the engine (4) efficiency, thus the generated power by the APU (20), is decreasing. This happens when the pressurized fuel in the fuel tank (6) is emptying and, in that case, the pressure injected in the engine (4) is lower than 15000 kPa. When the pressure P3 is monitored below 15000 kPa, it means that the pressure P1, the one monitored inside the fuel tank (6), is also lower than 15000 kPa.

Consequently, the engine controlling means (10.2) actuate the plurality of injectors (4.2) in order that the less pressurized fuel is injected at a lower position into the plurality of combustion chambers (4.4) of the engine (4).

The low position is to be understood as a lower position of the piston of a common combustion chamber compared to the fix position, previously mentioned, which is the optimal point of injection for a common combustion chamber and where the pressure inside the plurality of combustion chambers (4.4) is inferior compared to the pressure value corresponding to the fix position. That is, by injecting the fuel at a lower position than the fix position, a higher quantity of fuel is required from the engine (4) to maintain the same power production but at an inferior pressure of injection, optimizing the usage of the residual fuel from the fuel tank (6) so that the APU provides additional power if the aircraft suffers an emergency situation.

Once the pressure inside the fuel tank (6) is lower than 15000 kPa, the conditioning system (100) helps actuating on the fuel controlling means (10.1) and the engine controlling means (10.2) so that the condition system (100) is able to adapt the efficiency of the engine (4) by injecting less pressurized fuel at a lower position of the plurality of combustion chambers (4.4) of the engine (4) by means of the plurality of injectors (4.2). Advantageously, the aircraft is supplied with additional power, for example in case of emergency situations when an aircraft has to reach the closest airport in a safe manner.

In order to depict the difference of distance (d) between the fix position of injection and the lower position of injection inside the plurality of combustion chambers (4.4), FIGS. 3a and 3b show embodiments of the compression stage of the engine (4) in one combustion chamber (4.4).

In particular, FIG. 3b depicts an embodiment of the fix position of injection where, when the injection of fuel is made at this position, the combustion chamber (4.4) presents a small volume and the fuel injection pressure is higher than the pressure inside the combustion chamber (4.4). That is, the fix position of injection is implemented when optimal fuel pressure condition is fulfilled so that it can be injected and, thus, the engine (4) is able to provide optimal capacities and optimal power production.

On the other end, FIG. 3a depicts an embodiment of one lower position of injection with respect to the fix position where, when the injection of fuel is made at this position, the combustion chamber (4.4) presents a higher volume than the combustion chamber (4.4) of FIG. 3b at the time of injection and the fuel injection pressure is higher than the pressure inside the combustion chamber (4.4) of the FIG. 3b. That is, the lower position is implemented when the fuel has to be injected at a lower pressure inside the combustion chamber (4.4) and, thus, the engine (4) is able to provide part of its optimal capacities, but the engine (4) is still able to generate power by means of higher quantity of fuel consumption at a lower pressure than the optimal pressure value corresponding to the fix position.

In some embodiments, the fuel is injected into the plurality of combustion chambers (4.4) by direct injection.

Also, the present invention implements a master-slave algorithm which permits the actuation of the pressure regulating means (7) and/or the injection position of the pressurized gas fuel inside the plurality of combustion chambers (4.4) of the engine (4). In that sense, the residual pressurized gas fuel of the fuel tank (6), especially when the pressure inside the fuel tank (6) is lower than 15000 kPa, is used in such a way that the injection of the residual fuel is performed at a lower position inside the plurality of combustion chambers (4.4). This adaptation of the injection position inside the plurality of combustion chambers (4.4) may be either continuous or made by steps. By lowering the injection position of the fuel, the aircraft is able to consume the residual fuel from the fuel tank (6) and provide additional power generated from the engine (4), thus, providing additional life-saving time in emergency situations.

In the particular case of the fuel being hydrogen, requirements for normal functioning of the engine (4) are to exhaust a very low index of $NO_x$ at the APU outlet (5). For that purpose, the dilution of the pressurized gas fuel must be higher than twice its stoichiometric fuel mixture, also called $\lambda$, when preferably $\lambda > 2.7$. Additionally, the emission of $NO_x$ is independent of the point of injection of the pressurized gas fuel inside the plurality of combustion chambers (4.4). Also, lowering the point of injection of the pressurized gas fuel, as explained above, lowers the pressure inside the plurality of combustion chambers (4.4) of the engine (4) and, therefore, permits lowering the fuel pressure required for injecting gas fuel, preferably gaseous hydrogen, into the plurality of combustion chambers (4.4) of the engine (4). Thus, the residual fuel of the fuel tank (6), having a lower pressure than the reference pressure for optimal functioning of the engine (4), is also able to be consume by the engine (4). The ability to consume the residual part of the fuel of the fuel tank (6) provides additional power which would not be provided by a standard engine which is not coupled with the conditioning system (100) of the present invention.

The systems and devices described herein may include a controller, such as controller or controlling means (10), fuel controller or fuel controlling means (10.1) or engine controller or engine controlling means (10.2), control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A conditioning system for an aircraft comprising an Auxiliary Power Unit, wherein the Auxiliary Power Unit comprises:
   a fuel inlet configured to supply a pressurized gas fuel to a fuel conduit,
   an engine comprising an inlet connected to the fuel conduit,
   an outlet connected to an APU outlet, the APU outlet being configured to exhaust gases out of the engine,
   a plurality of injectors, and
   a plurality of combustion chambers,
   the fuel conduit connecting the fuel inlet to the engine,
   wherein the conditioning system comprises:
      a fuel tank comprising an outlet connected to the fuel inlet of the Auxiliary Power Unit, the fuel tank being configured to maintain the pressurized gas fuel pressurized at pressure Pf,
      a pressure regulator located downstream of the fuel tank, the pressure regulator being configured to regulate the pressure of the pressurized gas fuel injected to the fuel inlet of the Auxiliary Power Unit,
      a first temperature sensor located downstream of the pressure regulator and a second temperature sensor located upstream of the engine,
      a first pressure sensor located inside the fuel tank, a second pressure sensor located downstream of the pressure regulator and a third pressure sensor located at the inlet of the engine, and
      a controller connected to the first, second and third pressure sensors, and to the first and second temperature sensors, the controller being configured to receive temperature and pressure values from the first, second and third pressure sensors and from the first and second temperature sensors and to actuate on at least one of the pressure regulator or the injection position of the pressurized gas fuel inside the plurality of combustion chambers of the engine, the controller further comprising a fuel controller and an engine controller, wherein the first temperature sensor and the first and second pressure sensors are connected to the fuel controller, wherein the second temperature sensor and the third pressure sensor are connected to the engine controller, and
   the conditioning system being configured to:
      actuate the pressure regulator and inject the pressurized gas fuel at a fix position into the plurality of combustion chambers of the engine via the controller when a pressure P3 of the third pressure sensor is higher or equal to a pressure pre-established reference value Pref, or
      actuate the pressure regulator and inject the pressurized gas fuel at a lower position into the plurality of combustion chambers of the engine via the controller when the pressure P3 of the third pressure sensor is lower than Pref.

2. The conditioning system according to claim 1, wherein the fuel controller is configured to control the pressure regulator and is connected to the engine controller, and
wherein the engine controller is configured to control the position of injection of the pressurized gas fuel inside the plurality of combustion chambers of the engine and are configured to receive the temperature and pressure values from at least one of the second temperature sensor, the third pressure sensor, or from the fuel controller.

3. The conditioning system according to claim 1, wherein the conditioning system further comprises a valve located upstream of the inlet of the APU.

4. The conditioning system according to claim 1, wherein the plurality of injectors of the engine comprises direct injection ports.

5. The conditioning system according to claim 1, wherein the conditioning system further comprises a silencer located at the APU outlet.

6. The conditioning system according to claim 1, wherein the Auxiliary Power Unit further comprises a heater connected to the fuel inlet and located upstream of the engine, the heater being configured to supply heat to the pressurized gas fuel of the fuel conduit, and
wherein the condition system is configured to actuate the heater via the controller when a temperature T2 at the second temperature sensor is lower than a temperature pre-established reference value Tref.

7. The conditioning system according to claim 1 wherein the fuel pressure in the fuel tank, before actuating the APU, is between 35000 kPa and 100000 kPa.

8. The conditioning system according to claim 1, wherein the pressurized gas fuel is hydrogen.

9. An aircraft comprising a conditioning system according to claim 1.

10. A method for conditioning fuel of an Auxiliary Power Unit of an aircraft according to claim 9, the method comprising the following steps:
   monitoring temperatures T1 and T2 at the first and second temperature sensors respectively,
   monitoring pressures P1, P2 and P3 at the first, the second and the third pressure sensors respectively,
   comparing the temperatures T1 and T2 and pressures P1, P2 and P3 respectively with a temperature pre-established reference value Tref and the pressure pre-established reference value Pref via a controller, and controlling at least one of the pressure regulator or the injection position inside the plurality of combustion chambers of the engine via the controller.

11. The method for conditioning fuel according to claim 10 wherein, if $P3 \geq Pref$, the method further comprises the following steps:
   actuating the pressure regulator via the controller, and
   injecting the pressurized gas fuel at a fixed position into the plurality of combustion chambers of the engine via the controller.

12. The method for conditioning fuel according to claim 10 wherein, if $P3<Pref$, the method further comprises the following steps:
   actuating the pressure regulator via the controller, and
   injecting the pressurized gas fuel at a lower position into the plurality of combustion chambers of the engine via the controller.

13. The method for conditioning fuel according to claim 10, wherein, if $T2<Tref$, the method further comprises the following steps:
   actuating the heater via the controller.

14. The method for conditioning fuel according to claim 10, wherein the fuel is injected into the plurality of combustion chambers of the engine by direct injection.

15. The method for conditioning fuel according to claim 10,
   wherein, in step d), the pressure regulator is controlled via the fuel controller and the injection position inside the plurality of combustion chambers of the engine is controlled via the engine controller.

* * * * *